United States Patent [19]

Lee et al.

[11] Patent Number: 5,032,709
[45] Date of Patent: Jul. 16, 1991

[54] MAGNETIC CARD

[75] Inventors: Jig Y. Lee, Daedukgu; Un S. Yeo; Shin U. Park, both of Cheongjusi; Chun H. Jang, Yonginkun Kyungkido, all of Rep. of Korea

[73] Assignees: Electronics and Telecommunications Research Institute, Daejeon; Yushin Electionic Co. Ltd., Kido; Goldstar Co. Ltd., Seoul, all of Rep. of Korea

[21] Appl. No.: 538,219

[22] Filed: Jun. 14, 1990

[30] Foreign Application Priority Data

Jun. 15, 1989 [KR] Rep. of Korea ............... 1989-8240

[51] Int. Cl.$^5$ .................. G06K 19/06; B42D 15/10
[52] U.S. Cl. .................. 235/493; 235/487; 283/82; 283/94; 283/902
[58] Field of Search ............... 235/449, 493, 487, 488, 235/440; 428/900; 360/2; 283/904, 82, 94

[56] References Cited

U.S. PATENT DOCUMENTS

| 2,932,913 | 4/1960 | Hannon | 283/94 |
| 3,599,153 | 8/1971 | Lewis | 235/493 X |
| 4,114,032 | 9/1978 | Broscow et al. | 235/493 |
| 4,197,989 | 4/1980 | Pearce | 235/493 |
| 4,218,674 | 8/1980 | Broscow et al. | 235/493 X |
| 4,303,949 | 12/1981 | Peronnet | 235/493 X |
| 4,837,426 | 6/1989 | Pease et al. | 235/493 X |
| 4,977,040 | 12/1990 | Yano et al. | 283/82 X |

Primary Examiner—Stuart S. Levy
Assistant Examiner—Steven M. duBois
Attorney, Agent, or Firm—Blakely, Sokoloff, Taylor & Zafman

[57] ABSTRACT

A magnetic card manufactured according to the present invention is composed of a base film; a first magnetic material coating layer applied on the base film for reading and writing variable information held in the magnetic card; and a second magnetic material coating layer applied on the first magnetic material coating layer, of which surface having a pattern formed by an angle, an interval and a thickness for giving the characteristics of the magnetic card.

5 Claims, 4 Drawing Sheets

MAGNETIC CARD

BACKGROUND OF THE INVENTION

This invention relates to a magnetic card which is able to keep permanent signals for preventing its fraudulent misuse within the card.

The increasing use of magnetic cards including keys, identification passes, passports, credit cards or tokens etc., has led to the introduction of sophisticated techniques to prevent their fraudulent misuse.

In particular British Patent specification No. 1,331,604 describes a security card formed of a layer of anisotropic magnetic particles which in spaced regions of the layer are fixedly aligned along a predetermined direction, and in the remaining regions are not so aligned or are aligned along a substantially different direction. By uniaxially magnetising the aligned particles, the pattern of remnant magnetisation becomes permanent, and can only be destroyed if the document is destroyed also.

Such a pattern, therefore, which is sometimes referred to as a magnetic "watermark", or as forming a "permanent magnetic structure", may be used as a permanent identification or verification code, since the regions of differently aligned particles may be assigned different significance, e.g. a binary "1" or "0".

The card of this structure may be passed over a suitable reading device, for example a vertical or horizontal magneto resistive (MR) head.

Since, however, the mechanism for applying the special magnetic material on the card which can record for memory the permanent information was used in manufacturing the above structured card and its mechanism was too expensive, one problem of this technique was that the cost of the card was too high, and its processes were complicated.

SUMMARY OF THE INVENTION

Accordingly, an object of the invention is to provide an improved magnetic card which is manufactured by a simple process and its cost is very cheap, and which keeps permanent signals for preventing its frandulent misuse within the card.

In order to achieve the above object, a magnetic card manufactured according to the present invention is composed of a base film; a first magnetic material coating layer applied coating on the base film for reading and writing variable information held in the magnetic card; and a second magnetic material coating layer applied coating on the first magnetic material coating layer, of which surface having a pattern formed by an angle, an interval and a thickness for giving the characteristics of the magnetic card.

BRIEF DESCRIPTION OF THE DRAWINGS

The invention will be readily understood from the following more detailed description presented in conjunction with the following drawings, in which.

DETAILED DESCRIPTION OF THE PREFERRED EMBODIMENTS

Figure 1A:
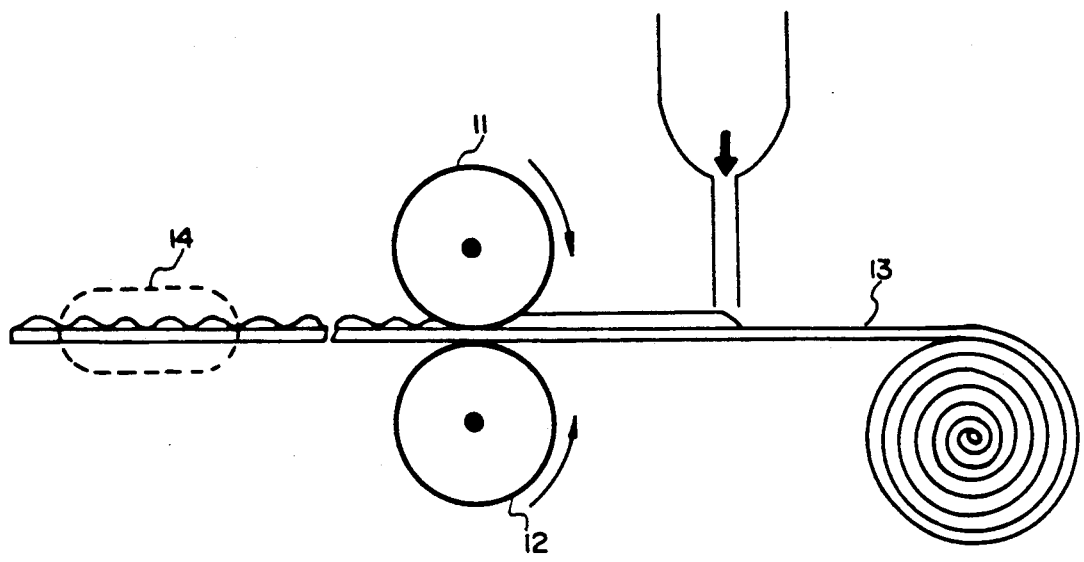
FIG. 1a is a diagram for explaining manufacturing processes of the present invention.

FIG. 1a is a diagram for explaining manufacturing processes of the present invention. In FIG. 1a, 11 and 12 shows upper and lower rollers, 13 a base film applying a first magnetic material coating, 14 a magnetic card manufactured by the present invention, respectively.

The magnetic card is made of the base film 13, the first magnetic material coating layer formed on the base film 13, and a second magnetic material coating layer formed on the first magnetic material coating layer. The second magnetic material coating layer may be the same material as the first magnetic material coating layer, and has the upper surface which is designed by the rollers 11 and 12 in order to form a pattern having a particular angle, an interval and a thickness on the surface.

Instead of the rollers 11 and 12, a plane board or a solid board may be used to form other patterns.

Figure 1B:
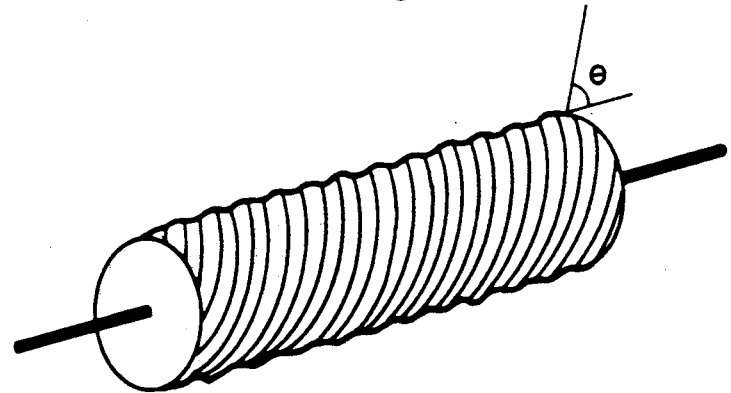
FIG. 1b is a diagram for showing a shape of the upper roller.

FIG. 1b is a diagram for showing a shape of the upper roller 11. As shown in FIG. 1b, the upper roller 11 is the roller which is grooved with a twist angle, an interval and a thickness. Based on the grooved roller 11, the proper pattern is formed on the magnetic card.

Figure 2A:
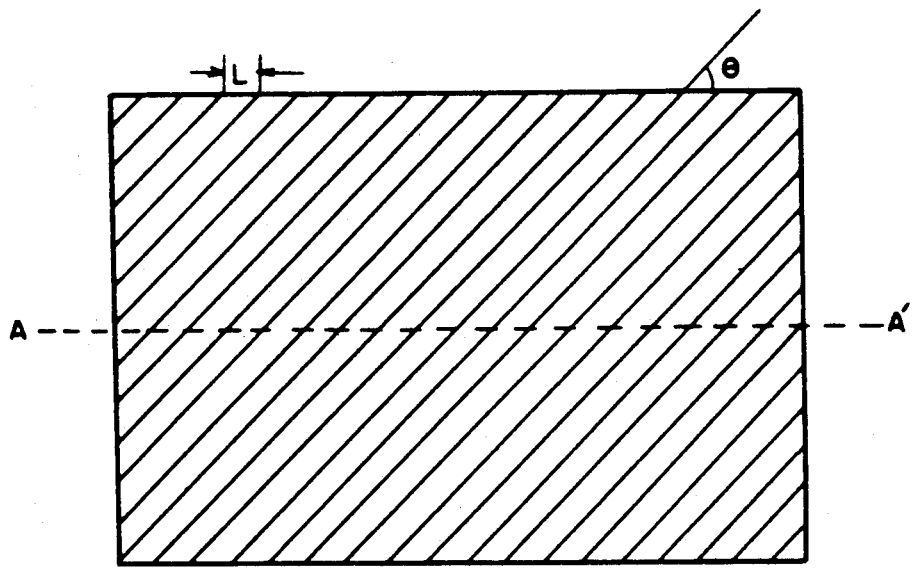
FIG. 2a and 2b are construction diagrams of the present invention.

FIG. 2a is a plan view of the magnetic card manufactured by the present invention. In FIG. 2a, an angle $\theta$ of the oblique lines on the magnetic card, is the same as the twist angle $\theta$ of the upper roller 11, and an interval L between the oblique lines is the same as the interval of the upper roller 11.

Figure 2B:
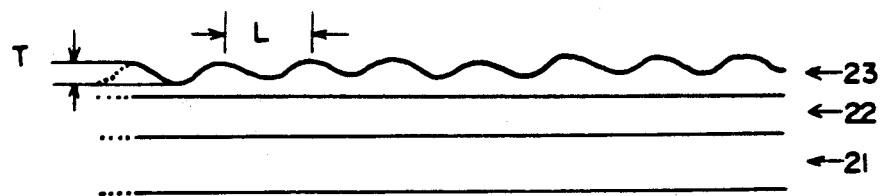

FIG. 2b is a cutting view across the line A—A' of FIG. 2a. In FIG. 2b, 21 shows a base film, 22 a first magnetic material coating layer, and 23 a second magnetic material coating layer, respectively. The thickness of the layers 22 and 23 is several micrometers ($\mu$m).

The base film 21 is made of the well-known card film. The first magnetic material coating layer 22 is formed by the conventional coating process, and has variable information of the magnetic card, that is, reads and writes the information such as ID numbers and an amount of money.

The second magnetic material coating layer 23 is the layer which keeps permanent signals for preventing fraudulent misuse, and is made of a magnetic thin film which can identify whether or not the magnetic card is true. When the second magnetic material coating layer 23 is being coated on the first magnetic material coating layer 22, the above mentioned rollers 11 and 12(in FIG. 1b) form the permanent signals on the magnetic card by using the characteristics of the rollers which is grooved with a twist angle, an interval and a thickness. This predetermined characteristics are used to identify the true card by producing proper induced voltage caused by the twist angle, the interval and the thickness on the card.

Figure 3A:
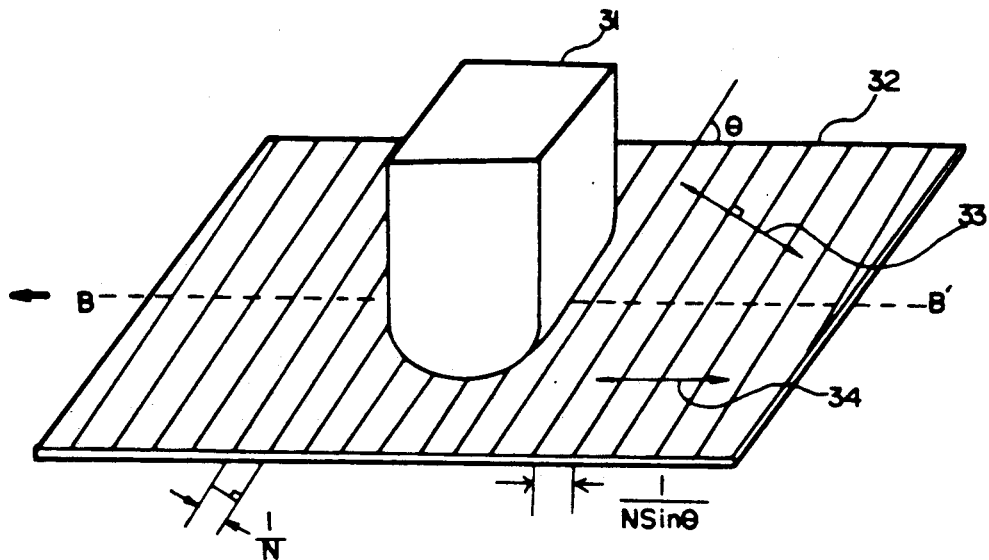
FIG. 3a and 3b are diagrams for showing the way the magnetic card reader reads the magnetic card of the present invention.

FIG. 3a is a diagram for showing the way the magnetic card reader reads the magnetic card of the present invention. In FIG. 3a, 31 shows the head of the card reader, 32 the magnetic card of the present invention, 33 the base direction for calculating the oblique lines per inch on the card, and 34 the direction that the physical head passes along, respectively.

Figure 3B:
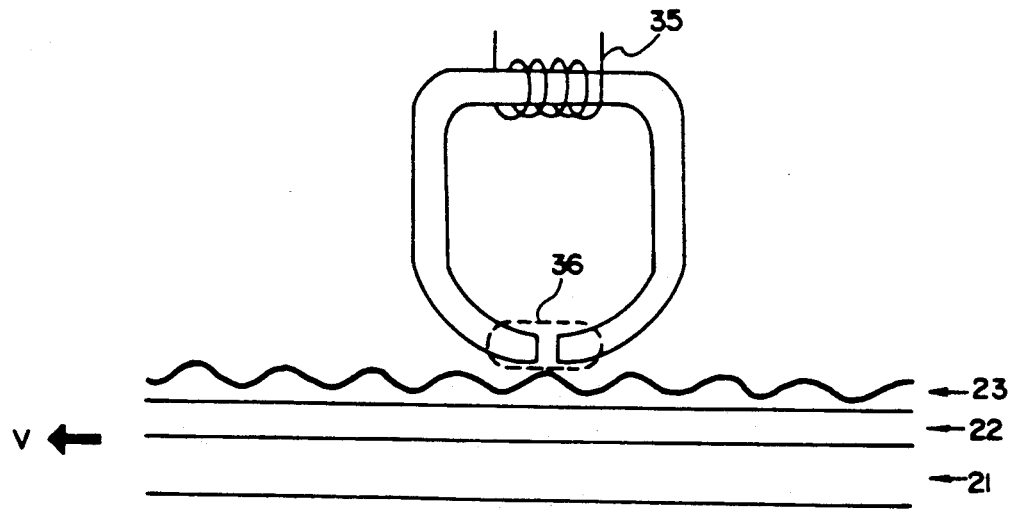

FIG. 3b is a cutting view across the line B—B' of FIG. 3a. In FIG. 3b, 35 shows the head coil of the magnetic card reader, and 36 the head gap, respectively.

As shown in FIG. 3a and 3b, the head gap 36 of the magnetic card reader 31 is set in parallel with the oblique lines on the card, and the card is passed along the direction 34 with the predetermined speed V. By this construction, the amount of the magnetic flux coming into the head gap 36 is changed, this change produces the induced voltage in the head coil 35, and it produces the signal of the predetermined period and amplitude.

For example, when the number of the oblique lines on the magnetic card is N per inch, the head recognizes $(1/N.\sin\theta)$ lines per inch because the physical card is passed along the direction 34.

Then, the frequency of output signals is determined from following equation.

$$f = V/\lambda \text{ (f: frequency V: speed } \lambda \text{: interval)}$$

Figure 4A:
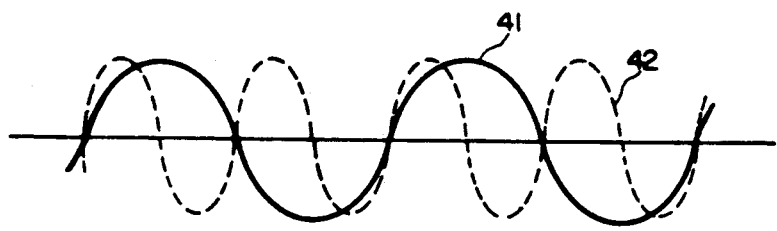
FIG. 4a and 4b are diagrams for comparing waveforms of the output signals.

FIG. 4a is a diagram for comparing output signals due to the difference of the interval L. As shown in FIG. 4a, when the interval of the first signal 41 is twice as long as the interval of the second 42, the frequency of the first signal 41 is double of the frequency of the second 42.

Figure 4B:
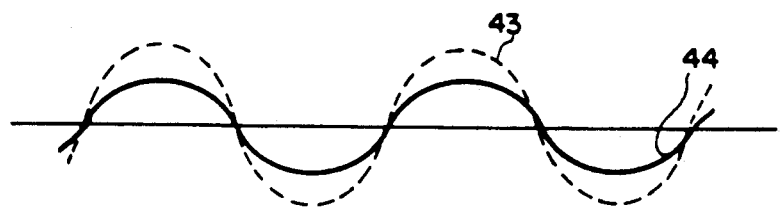

FIG. 4b is a diagram for comparing output signals due to the difference of the thickness T. As shown in the waves 43 and 44 of FIG. 4b, the difference of the thickness T changes the amplitude of the signal.

In the above embodiment, it is possible to adopt an angle between 0 relative to 180° to the direction of motion of the card as the angle of the oblique line And also the interval L between the oblique lines can be established irregularly as well as regularly. The first and second magnetic material coating layers can be applied on the entire surface of the base film, or only on a track that the card reader passes along.

As shown above, the present invention can give various characteristics of the magnetic card simply by controlling the angle, the interval and the thickness formed on the magnetic material coating on the magnetic card for preventing fraudulent misuse.

What is claimed is:

1. A magnetic card including a base film and a first magnetic material coating layer applied on the base film for reading and writing variable information held within the magnetic card, the magnetic card further comprising:

a second magnetic material coating layer applied on the first magnetic material coating layer, wherein the second magnetic material coating layer provides a surface having a wave shape profile formed by thickness differences in the second magnetic material coating layer, the wave shape profile appearing on the surface as oblique lines slanted substantially uniformly at an angle and spaced apart in substantially regular intervals.

2. A magnetic card according to claim 1, wherein the angle of the oblique lines is an angle between 0° to 180° relative to a direction of motion of the magnetic card.

3. A magnetic card according to claim 1, wherein the first and second magnetic material coating layers are applied on the entire surface of the base film.

4. A magnetic card according to claim 1, wherein the first and second magnetic material coating layers are applied on a track that the card reader passes along.

5. A magnetic card according to claim 1, wherein the magnetic material of the second magnetic material coating layer is the same as the first magnetic material coating layer.

* * * * *

UNITED STATES PATENT AND TRADEMARK OFFICE
CERTIFICATE OF CORRECTION

PATENT NO. : 5,032,709
DATED : 7/16/91
INVENTOR(S) : Lee et al.

It is certified that error appears in the above-identified patent and that said Letters Patent is hereby corrected as shown below:

col. 03, line 16  delete "(1/N.sin θ)"  insert --(1/N•sin θ)--
col. 03, line 34  delete "0"  insert --0°--

Signed and Sealed this

First Day of June, 1993

*Attest:*

*Attesting Officer*

MICHAEL K. KIRK

*Acting Commissioner of Patents and Trademarks*